Patented Aug. 13, 1929.

1,724,027

UNITED STATES PATENT OFFICE.

MAURICE KAHN, OF PARIS, AND ELIANE LE BRETON AND GEORGES SCHAEFFER, OF STRASBOURG, FRANCE, ASSIGNORS TO SOCIETE FRANCAISE DES PRODUITS ALIMENTAIRES AZOTES, OF PARIS, FRANCE, A JOINT-STOCK COMPANY OF FRANCE.

PROCESS FOR INDUSTRIAL USE OF INFERIOR VEGETABLES.

No Drawing. Application filed November 19, 1924, Serial No. 750,951, and in France November 20, 1923.

Heretofore large quantities of yeasts, principally beer yeast, have gone to waste because no sufficiently economical means were available for their utilization in a practical way.

Numerous attempts have been made to utilize these yeasts either in a fresh state or in a dry state, or again after having been treated by autolysis for feeding cattle or to obtain products similar to extracts of meat; these attempts have been most often abandoned for the following reasons: The yeast in a fresh state is not proper food for pigs and the bacon of animals fed in that way is of a poor quality; the preparation of dried yeast or the treatment of yeast by autolysis is a costly one and the cost price of such products is a prohibitive one if compared to those of other industrial nitrogen by-products.

The present invention renders it possible to utilize: 1st the autolysis of the beer or distillery yeasts, of the amylomyces or of the rhizopus under fixed conditions in such a way that the products obtained under the form of aminated acids correspond practically to the total amount of the albuminæ of the said vegetables; 2nd the cellulosic residues or the dead bodies of these vegetables; 3rd the powerful antiseptic which exists or which is developed during the autolysis of beer yeast.

The second of these utilizations by itself meets a great part of the expense of an industry based upon the autolysis of these inferior vegetables.

The following is an example of an operation made with beer yeast: The yeast as it is taken out of the brewery vat is pressed, or dried in a centrifugal machine, it is then emulsified in alkaline carbonate of soda or of ammonia, the concentration of which is between one and five per thousand; the yeast is then pressed again and afterwards washed with a solution of hydrochloric acid of appropriate concentration, which renders to the cellulæ the concentration of ions H necessary for realizing the best action of the leavens. The yeast thus treated is again pressed; the aim of these operations being to lessen the bitterness of the products to be obtained subsequently without affecting the autolysis.

The yeast thus obtained contains 80% of water and is placed in large thermostatic vats. According to circumstances sodium chlorid is added or not; if added this is in a proportion of not more than 60 grams for each kilogram of yeast. The temperature of the vats is maintained between 36° and 44° C. and the duration of the autolysis varies between 3 to 20 days, these conditions varying with the nature of the products to be obtained and with the utilized vegetable species. The agitation and the aeration in the vats vary also according to the aim to be reached and to the time elapsed since the starting of the operation. When, by using an appropriate test it is recognized that the autolysis is sufficient, the vats are emptied and the content of these is diluted with at least one equal volume of water in order to facilitate the separation of the liquid from the solid parts. This separation is realized by means of common industrial apparatus such as centrifugal or super-centrifugal machines, press filters, etc.

The autolyzed liquid is bleached by means of one of the well known processes, bone-black, Florida earth, clearing, etc.

Whatever may be the destination of the autolyzed liquid and the refining to which it is subsequently submitted the autolyzed liquid is evaporated under vacuum (20 to 40 m/m of mercury) and under a temperature of 70° C. The evaporation under vacuum leads to the obtaining of pastes containing 10 to 30% of water. These pastes may be dried and brought into the state of powder without altering the products when maintained at a temperature under 70° C.

Along these general lines, the said process may be also applied to the treatment of alcohol yeasts, of rhizopus or of amylomyces. The great difference between these various vegetables resides in the following fact: The autolysis of beer yeast takes place without any addition of antiseptic substance, under the very conditions above referred to; the autolysis of the three other species is also possible without addition of antiseptic substances if care is taken to realize it in the same medium containing from 5 to 10% of alcohol. The acid alcohol remaining in the medium at the end of the treatment is totally recovered. For these three species the removal of the bitterness is, of course, not done before autolysis by washing with carbonate lye.

The pastes thus obtained may in any case be kept easily. Their percentage in aminated acids is such that they are proper not only as nitrogen containing food for the maintenance, but also for the growing or the fattening of cattle, and also for human consumption. The pastes made for cattle are eaten without any subsequent refining after they have been concentrated under vacuum; as the case may be they are mixed with A, B, C vitamin extracts of animal or vegetable source. These pastes render possible to utilize, for feeding cattle, vegetables or industrial by-products, the percentage of which in nitrogen is qualitatively or quantitatively insufficient and which they complete.

In the case where it is intended to manufacture products for human consumption, the pastes are again refined in order to remove any bitterness left in the pastes, for example by means of oxygenated water. The products are then delivered either under the shape of regimen biscuits or of succedenea of meat extracts, or broth, of culinary sauces. In certain cases, they may be mixed with vegetable concentrated broths, crustacean or mollusk extracts, etc.

Prior to the present process only the nitrogen containing autolyzed liquid was used; this explains the losses sustained by industries which were solely based on the sale of such products which are of a high cost price. The present invention renders it possible to utilize the cellulosic by-products which result from the treatment of these inferior vegetables when deprived of their albumina: yeasts, rhizopus or amylomyces.

These cellulosic by-products result in a more or less coloured paste according to the species, extremely unctuous and containing 86% of water after the autolyzed liquid has been taken out. The amount of greases of this paste is very small, but this paste possesses a remarkable emulsifying power as concerns fluid, semi-fluid or solid greases or oils.

According to the invention this emulsifying property has been utilized for making artificial "moëllons" or "dégras" (fatty compositions for the treatment of leather). These "dégras" are obtained in the following manner: Cellulosic by-products heated at 50° C. are handled in mixers or mechanical kneading-troughs with greases heated between 40 and 80° C. according to their fluidity. The proportion and the quality of the greases vary according to the nature of the "dégras" to be obtained. These greases may be pure glycerides or mixtures in determined proportions of glycerides, containing oxydated fatty acids, soap unsaponifiable substances. The action of the leavens or oxydases still present in the vegetable by-products may be stopped by a rapid heating at 80° C. before handling. In order to prevent the putrefaction of synthetic "dégras," they may be mixed with one of the appropriate antiseptic substances: sodium fluoride, thymol, chloroforme, etc., which are without any injurious action on the leathers.

It may be observed that the cellulosic residua of denitrogenized inferior vegetables, utilized for the manufacture of these "dégras" may be obtained by any other process as autolysis; for example, by extraction in a stove by sodium carbonate of the albuminæ of these vegetables, the said extraction freeing also the cellulosic covers.

On the other hand, in the present invention we have utilized the fact that the autolysis of beer yeasts takes place without its being necessary to add to it an antiseptic substance and without presence of alcohol in the medium. This results from the fact that beer yeasts contain, or make by themselves during their autolysis, one or a plurality of antiseptic substances which resist the development of the putrefaction bacteria. We have succeeded in separating these antiseptic substances quantitatively. These substances are obtained in great quantity in the course of the distillation of the autolyzed liquid under reduced pressure and in a water bath with heating over 70° C. The antiseptic substance thus obtained in the form of a diluted aqueous solution is subsequently deprived of the volatile fatty acids it contains through an extraction by means of ether or petrol ether. Concentrated solutions are obtained by means of fractional distillation. A fact of a very great industrial importance is that these solutions may be used in the autolysis of all the animal or vegetable albuminoid substances without the aid of any other antiseptic. The industrial advantages of this antiseptic substance are the following:

1. Cost price practically nothing as it is a by-product of the manufacture and its recovery is made automatically during the course of the manufacture of the beer yeast pastes.

2. Easy use even in a state of weak concentration to allow the autolysis of great quantity of vegetable or animal albuminen (fish, meat, fish and meat waste, inferior vegetables other than beer yeast, cereals, etc.) safe from the action of microbes.

3. The autolysis of the substances above referred to, in presence of this antiseptic gives specially interesting products because they are in no way altered on account of the antiseptic during the autolysis. The nitrogen containing pastes have no peculiar smell, or relish, the greases are not oxydated, the bone night-soils are undamaged.

*Example.*—The fish is pounded by means of appropriate grinders. The necessary quantity of antiseptic (varying according to the species) is added; the mass is put in a stove and kept at a temperature varying from 30° to 45° C. during 3 to 20 days. The mass thus treated is passed over seams which retain the night soil. The paste which passes through the seams is of a sirupy consistency and is afterwards passed through a press filter or treated in a centrifugal machine after having been mixed with a necessary volume of water; a liquid is thus obtained which contains the aminated acids and which is subsequently treated for the purpose of obtaining paste and there is left on another hand, the fatty parts of the fish mixed with nitrogen containing residua incompletely digested. These latter residua are kinds of natural fatty bodies which may be used in leather treating.

4. Ease of recovery of this antiseptic substance, total separation from the nitrogen containing paste, no poisonousness during the handling.

What we claim is:

1. A process for treating beer yeast and like substances for the production of an antiseptic suitable for use in autolyzing operations, which process consists in autolyzing the yeast for a period of from three to twenty days at a temperature between 36° and 44° C., without addition of an antiseptic, agitating the mass, then separating the autolysate from the non-liquid matters, and extracting from the autolysate the antiseptic substance produced therein by the foregoing treatment.

2. In a process such as specified in claim 1, the step of separating the antiseptic substance by distillation at a temperature lower than 70° C.

3. In a process such as specified in claim 1, evaporating the separated liquid under a pressure of from 20 to 40 m/m of mercury and at a temperature lower than 70° C.

4. In a process such as specified in claim 1, the step of fractional distillation of the autolysate, thereby obtaining a concentrated solution of the antiseptic substance.

5. In a process such as specified in claim 1, the treatment of the yeast before the autolysis thereof by pressure and washing for the removal of the bitterness thereof.

In testimony whereof we affix our signatures.

MAURICE KAHN.
ELIANE LE BRETON.
GEORGES SCHAEFFER.